US008335078B2

(12) United States Patent
Lee et al.

(10) Patent No.: US 8,335,078 B2
(45) Date of Patent: Dec. 18, 2012

(54) PORTABLE ELECTRONIC DEVICE

(75) Inventors: Ying-Xing Lee, Taoyuan County (TW); I-Cheng Chuang, Taoyuan County (TW); Chien-Wei Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 229 days.

(21) Appl. No.: 12/763,184

(22) Filed: Apr. 19, 2010

(65) Prior Publication Data

US 2011/0051330 A1 Mar. 3, 2011

(30) Foreign Application Priority Data

Aug. 28, 2009 (TW) .............................. 98129121 A

(51) Int. Cl.
*H05K 7/00* (2006.01)
*H04M 1/03* (2006.01)

(52) U.S. Cl. ............... 361/679.56; 455/90.3; 455/575.1; 455/575.4

(58) Field of Classification Search ............. 361/679.01, 361/679.56; 455/575.4, 575.8, 90.2–90.3, 455/575.1
See application file for complete search history.

(56) References Cited

U.S. PATENT DOCUMENTS

| | | | |
|---|---|---|---|
| 7,466,558 B2 | 12/2008 | Yasuda | |
| 7,596,396 B2 * | 9/2009 | Fagrenius et al. | 455/575.4 |
| 8,055,315 B2 * | 11/2011 | Komiyama | 455/575.1 |
| 8,265,715 B2 * | 9/2012 | Komiyama | 455/575.1 |
| 2007/0230125 A1 * | 10/2007 | Lo et al. | 361/697 |
| 2007/0238494 A1 * | 10/2007 | Pan | 455/575.4 |
| 2007/0270180 A1 * | 11/2007 | Takagi | 455/550.1 |
| 2007/0275774 A1 | 11/2007 | Fagrenius et al. | |
| 2009/0052126 A1 * | 2/2009 | Komiyama | 361/679.56 |
| 2009/0067138 A1 * | 3/2009 | Oliver et al. | 361/730 |
| 2009/0170450 A1 * | 7/2009 | Krenz et al. | 455/90.3 |
| 2010/0099467 A1 * | 4/2010 | Lee | 455/575.4 |
| 2011/0000712 A1 * | 1/2011 | Kasuga et al. | 174/650 |
| 2011/0077063 A1 * | 3/2011 | Yabe et al. | 455/575.4 |
| 2011/0228491 A1 * | 9/2011 | Sakai et al. | 361/749 |

FOREIGN PATENT DOCUMENTS

| | | |
|---|---|---|
| CN | 101395557 A | 3/2009 |
| EP | 1990703 | 11/2008 |

(Continued)

OTHER PUBLICATIONS

"Extended Search Report of European Counterpart Application", issued on Jul. 27, 2010, p. 1-p. 3, in which the listed references were cited.

(Continued)

*Primary Examiner* — Robert J Hoffberg
(74) *Attorney, Agent, or Firm* — Jianq Chyun IP Office

(57) ABSTRACT

A portable electronic device including a first body, a second body, a sliding module, a flexible electrical member, and a first seal member is provided. The first body has a first opening. The sliding module is disposed between the first and the second bodies. The sliding module has a second opening. The flexible electrical member passes through the first and the second openings, and is connected between the first and the second bodies. The first seal member is disposed between the sliding module and the first body and surrounds the first opening.

10 Claims, 5 Drawing Sheets

FOREIGN PATENT DOCUMENTS

| | | | | |
|---|---|---|---|---|
| JP | 2004153597 | A | * | 5/2004 |
| JP | 2008091091 | A | * | 4/2008 |
| TW | M355539 | | | 4/2009 |
| TW | 200926735 | | | 6/2009 |
| WO | 2009002103 | | | 12/2008 |
| WO | 2009112086 | | | 9/2009 |

OTHER PUBLICATIONS

"First Office Action of China Counterpart Application", issued on Sep. 21, 2011, p. 1-p. 5, in which the listed reference was cited.

"Office Action of Taiwan Counterpart Application", issued on Aug. 22, 2011, p. 1-p. 9, in which the listed references were cited.

* cited by examiner

US 8,335,078 B2

PORTABLE ELECTRONIC DEVICE

CROSS-REFERENCE TO RELATED APPLICATION

This application claims the priority benefit of Taiwan application serial no. 98129121, filed on Aug. 28, 2009. The entirety of the above-mentioned patent application is hereby incorporated by reference herein and made a part of specification.

BACKGROUND OF THE APPLICATION

1. Field of the Application

The application relates to a portable electronic device. More particularly, the application relates to a portable electronic device having a waterproof function.

2. Description of Related Art

With the development in technology, people's reliance on electronic devices is increases day by day. Currently, users usually require electronic devices to include features of high operation performance, compactness, and so on. Therefore, various portable electronic devices such as ultra mobile personal computers (UMPCs), tablet PCs, pocket PCs, personal digital assistants (PDAs), and cellular phones are developed accordingly.

Some of the existing portable electronic devices adopt a folding or a sliding body design, so that the screen and the keypad are respectively disposed on two stacked bodies to be operated conveniently. Moreover, a flexible printed circuit (FPC) is adopted to connect the two bodies.

In conventional body structures, the body and the sliding module are designed with openings for the flexible electrical member. However, this open design can not prevent liquid from entering the body via the openings, such that corrosion of components inside the housing or short circuit usually results.

SUMMARY OF THE APPLICATION

The application is directed to a portable electronic device having a waterproof function.

According to an embodiment of the application, a portable electronic device including a first body, a second body, a sliding module, a flexible electrical member, and a first seal member is provided. The first body has a first opening. The sliding module is disposed between the first body and the second body. The sliding module has a second opening. The flexible electrical member passes through the first opening and the second opening and is connected between the first and the second bodies. The first seal member is disposed between the sliding module and the first body, and surrounds the first opening.

According to an embodiment of the application, a portable electronic device including a first body, a second body, a sliding module, a flexible electrical member, and a seal member is provided. The sliding module is disposed between the first and the second bodies. The sliding module has an opening. The flexible electrical member passes through the opening and is connected between the first and the second bodies. The seal member is disposed between the sliding module and the second body, and surrounds the opening.

In light of the foregoing, in the embodiments aforementioned, since the seal member is disposed between the body and the sliding module and surrounds the opening, the seal member is pressed by the sliding module and the body so as to result in a sealing effect. Hence, the portable electronic device has a waterproof function.

In order to make the aforementioned and other features and advantages of the application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

Figure 1:
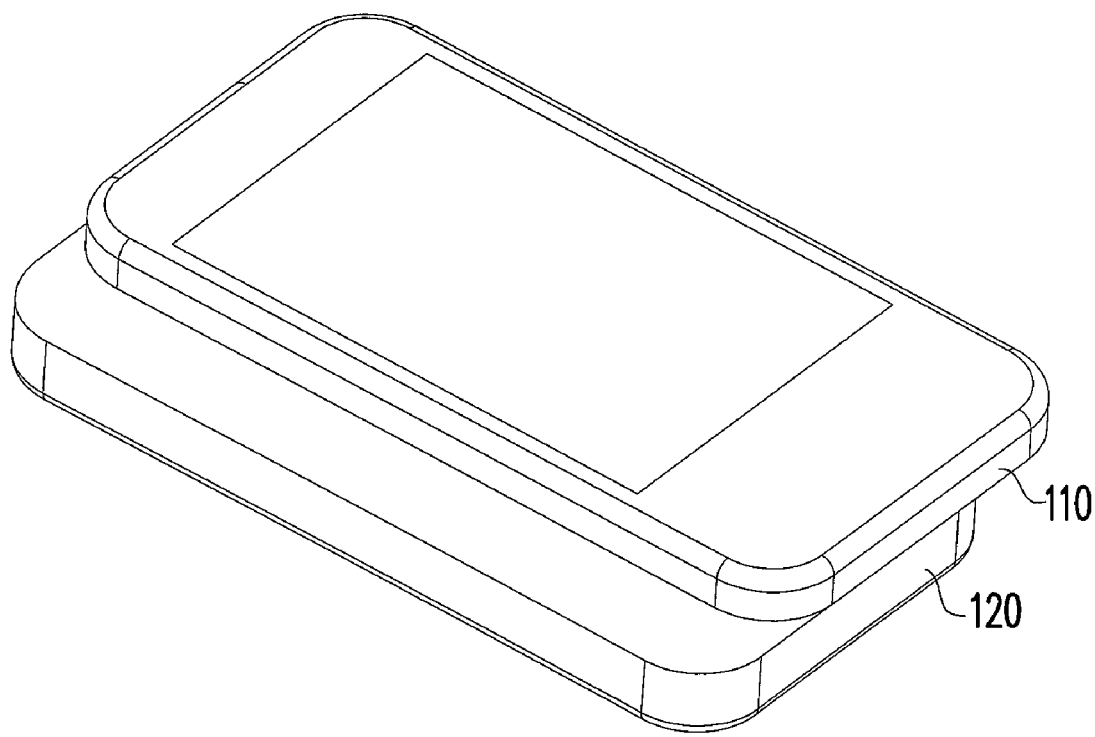
FIG. 1 is a schematic view illustrating a portable electronic device according to an embodiment of the application.
Figure 2:
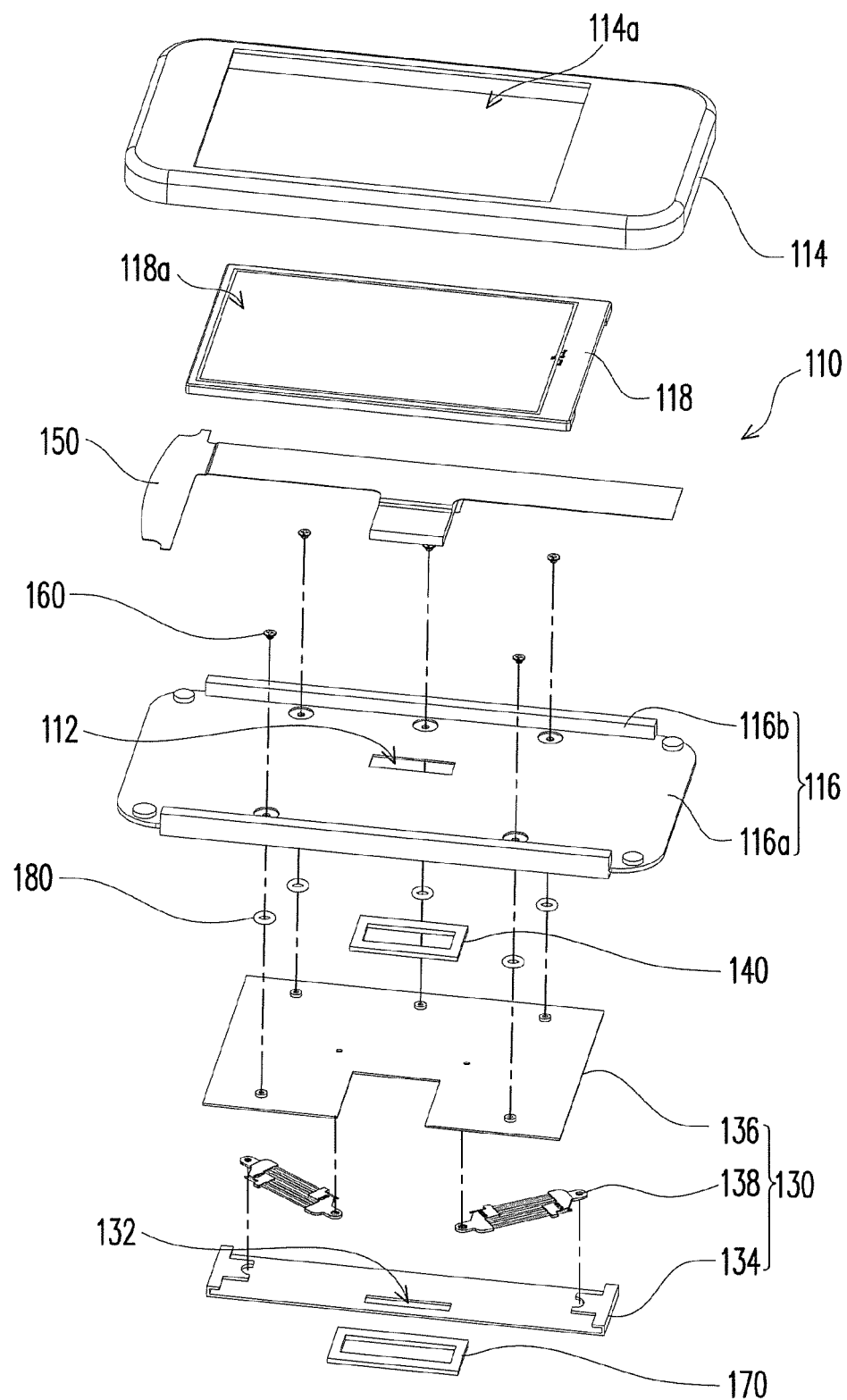
FIG. 2 is an exploded view of a first body and a sliding module of the portable electronic device in FIG. 1.

FIG. 1 is a schematic view illustrating a portable electronic device according to an embodiment of the application. FIG. 2 is an exploded view of a first body and a sliding module of the portable electronic device in FIG. 1. Referring to FIG. 1 and FIG. 2, in the present embodiment, a portable electronic device 100 includes a first body 110, a second body 120, a sliding module 130, and a first seal member 140. The sliding module 130 is disposed between the first body 110 and the second body 120, so that the first body 110 slides relative to the second body 120.

Figure 3:
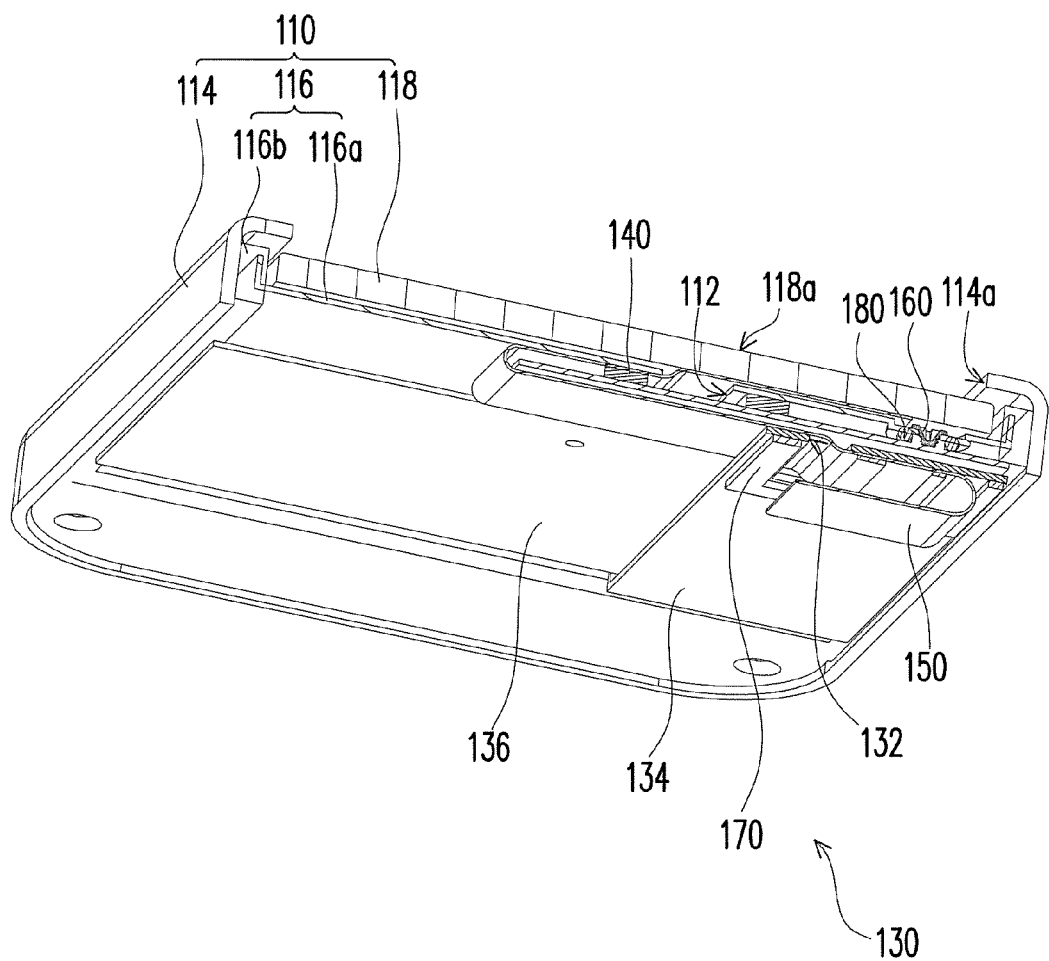
FIG. 3 is a sectional view of the first body of the portable electronic device in FIG. 1.
Figure 4:
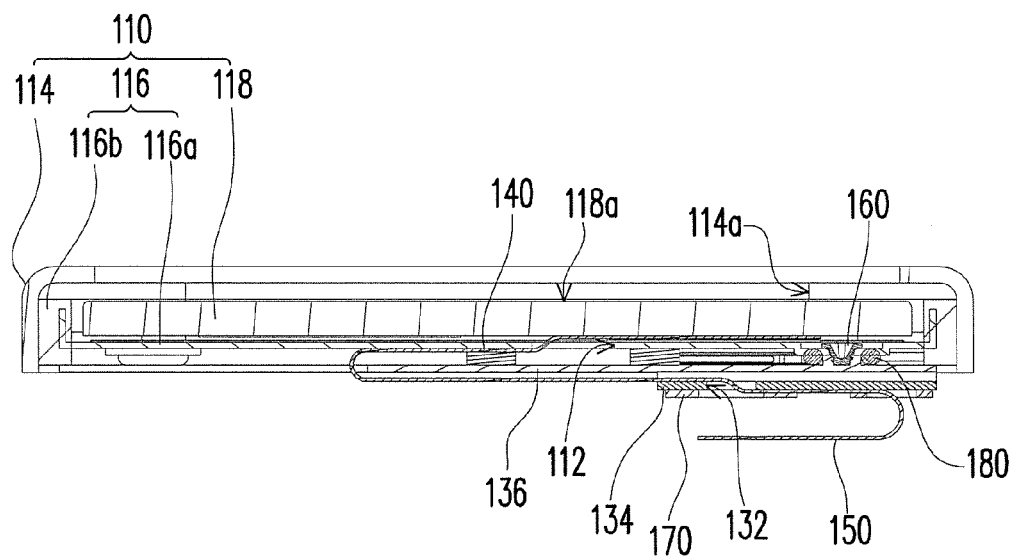
FIG. 4 is a cross-sectional view of the portable-electronic device in FIG. 3.

FIG. 3 is a sectional view of the first body of the portable electronic device in FIG. 1. FIG. 4 is a cross-sectional view of the portable electronic device in FIG. 3. Referring to FIG. 3 and FIG. 4, the portable electronic device 100 further includes a flexible electrical member 150, such that the first body 110 is electrically connected to the second body 120 via the flexible electrical member 150 (indicated in FIG. 1). In order for the flexible electrical member 150 to connect the first body 110 and the second body 120 smoothly in structure, the first body 110 has a first opening 112 and the sliding module 130 has a second opening 132. Consequently, the flexible electrical member 150 is capable of passing through the first opening 112 and the second opening 132 so as to be connected between the first body 110 and the second body 120.

In addition, the first seal member 140 is disposed between the sliding module 130 and the first body 110, and surrounds the first opening 112. In the present embodiment, the first seal member 140 is made of rubber. Thus, the first seal member 140 can be pressed by the first body 110 and the sliding module 130 simultaneously, such that the first body 110 and the second body 120 surround the first opening 112 without leaving any seams.

The portable electronic device 100 further includes a second seal member 170 disposed between the sliding module 130 and the second body 120 and surrounds the second opening 132. Similarly, the second seal member 170 is made of rubber. Thus, the second seal member 170 can be pressed by the sliding module 130 and the second body 120 simultaneously, such that the first body 110 and the second body 120 surround the second opening 132 without leaving any seams.

Referring to FIG. 2 and FIG. 3 simultaneously, in the present embodiment, the first body 110 includes a display module 118 and a first housing 114 and a second housing 116 that are connected to each other. The first housing 114 includes a third opening 114a configured to expose a display face 118a of the display module 118. The first opening 112 is located on the second housing 116. The second housing 116 includes a metal plate 116a and a plastic side strip 116b. In the present embodiment, the metal plate 116a is integrally formed with the plastic side strip 116b by applying an embedded injection molding technique. The use of this technique also prevents liquid from flowing into the first body 110 from the second housing 116.

The sliding module 130 includes a first member 134 and a second member 136 that are coupled to each other and two driving members 138. Two ends of each driving member 138 are connected to the first member 134 and the second member 136 respectively. The second member 136 is disposed on the second housing 116. The first member 134 is disposed on the second body 120. The second opening 132 aforementioned is located on the first member 134. When a user slides the first body 110 relative to the second body 120, each driving member 138 provides a driving force for the first body 110 to slidably extend self-automatically relative to the second body 120 or return to the original stacked state.

Figure 5:
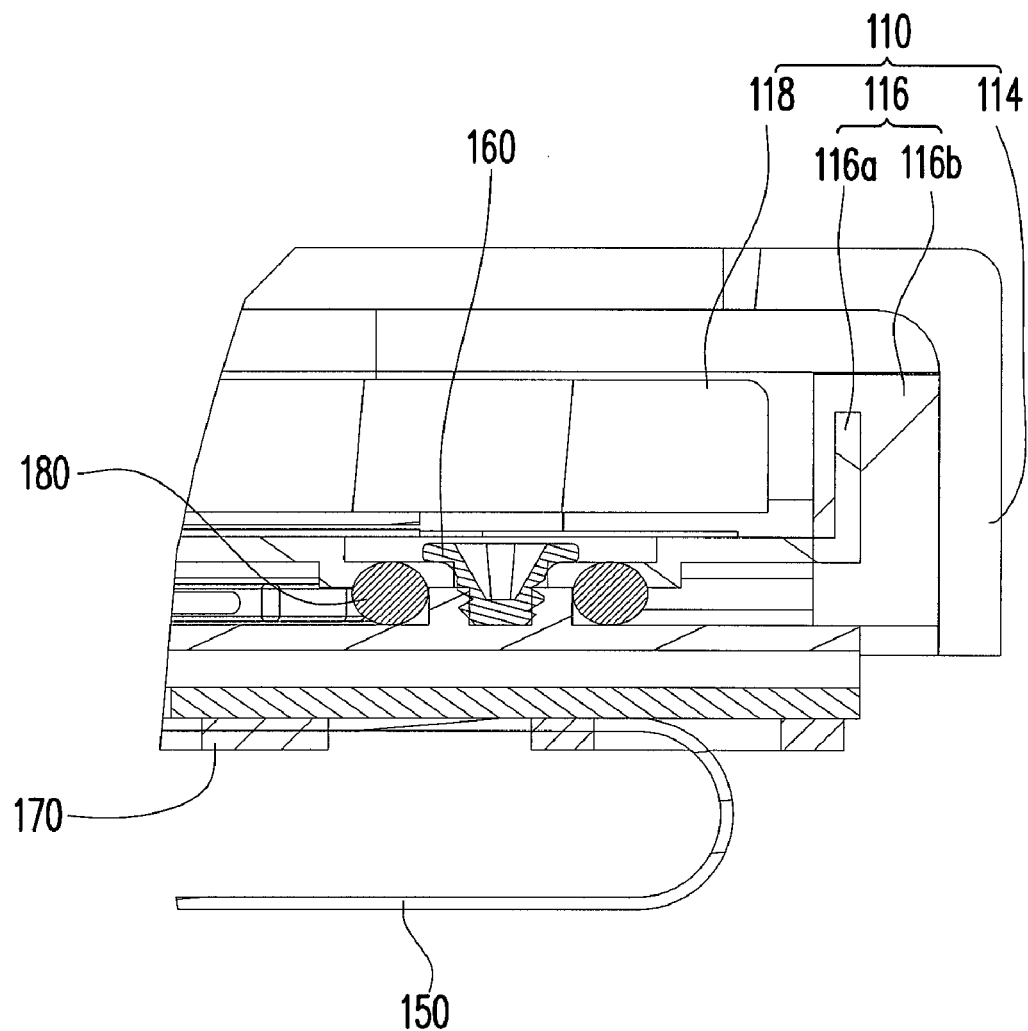
FIG. 5 is a partial enlarged view of the portable electronic device in FIG. 4.

FIG. 5 is a partial enlarged view of the portable electronic device in FIG. 4. Referring to FIG. 2 and FIG. 5 simultaneously, the portable electronic device 100 further includes a plurality of fasteners 160 and a plurality of third seal members 180. Each fastener 160 is a screw, for example, and is capable of fastening the metal plate 116a of the first body 110 to the second member 136 of the sliding module 130. Each third seal member 180 is made of rubber. The third seal members 180 are disposed between the first body 110 and the sliding module 130 and surround the fasteners 160.

In the present embodiment, the first seal member 140 and the third seal members 180 are all located between the metal plate 116a and the second member 136. When the fasteners 160 fasten the metal plate 116a to the second member 136, the first seal member 140 and the third seal members 180 are all pressed by the second member 136 and the metal plate 116a so as to be deformed. As a consequence, the second member 136 and the metal plate 116a do not have any seams at the first opening 112 and the fasteners 160, thereby achieving a waterproof effect. In the present embodiment, locations, structures, and an amount of the fasteners 160 are not limited. Any fasteners 160 capable of fixing the metal plate 116a and the second member 136 and causing a pressing effect to the seal members 140, 170, and 180 in-between can all be adapted in the present embodiment.

In summary, in the embodiments aforementioned in the present application, the portable electronic device has seal members surrounding the first opening and the second opening that are passed through by the flexible electrical member and surrounding the fasteners. Hence, the seal members are pressed by the sliding module and the body so as to cause a sealing effect of the openings. As a result, the peripheries of the first opening and the second opening are sealed for the portable electronic device to achieve a waterproof effect.

Although the application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:

1. A portable electronic device, comprising:

a first body having a first opening;

a second body;

a sliding module disposed between the first body and the second body and having a second opening;

a flexible electrical member passing through the first opening and the second opening and connected between the first body and the second body; and a first seal member disposed between the sliding module and the first body and surrounding the first opening, wherein the first body comprises a first housing and a second housing connected to each other, the sliding module comprises a first member and a second member coupled to each other, the second member is disposed on the second housing, the first member is disposed on the second body, the first opening is located on the second housing, the second opening is located on the first member, the first seal member is located between the second housing and the second member, so that the first seal member is pressed by the second member and the second housing to be deformed, and the first seal member is pressed by the first body and the sliding module at the same time so as to seal the first opening.

2. The portable electronic device as claimed in claim 1, further comprising:

a second seal member disposed between the sliding module and the second body and surrounding the second opening.

3. The portable electronic device as claimed in claim 2, wherein a material of the second seal member comprises rubber.

4. The portable electronic device as claimed in claim 1, further comprising:

a fastener fastening the first body to the sliding module; and a third seal member disposed between the first body and the sliding module and surrounding the fastener.

5. The portable electronic device as claimed in claim 4, wherein a material of the third seal member comprises rubber.

6. The portable electronic device as claimed in claim 1, wherein the second housing comprises two plastic side strips and a metal plate, and two opposite side edges of the metal plate are embedded in a respective strip of the two plastic side strips.

7. The portable electronic device as claimed in claim 1, wherein a material of the first seal member comprises rubber.

8. A portable electronic device, comprising:

a first body;

a second body;

a sliding module disposed between the first body and the second body and having an opening;

a flexible electrical member passing through the opening and connected between the first body and the second body; and a seal member disposed between the sliding module and the second body and surrounding the opening, wherein the first body comprises a first housing and a second housing connected to each other, the sliding module comprises a first member and a second member coupled to each other, the first member is disposed on the second body, the second member is disposed on the second housing, the opening is located on the first member, the seal member is located between the first member and the second body, so that the seal member is pressed by the first member and the second body to be deformed, and the seal member is pressed by the second body and the sliding module at the same time so as to seal the opening.

9. The portable electronic device as claimed in claim 8, wherein a material of the seal member comprises rubber.

10. The portable electronic device as claimed in claim 8, wherein the second housing comprises two plastic side strips and a metal plate, and two opposite side edges of the metal plate are embedded in a respective strip of the two plastic side strips.

* * * * *